United States Patent
Fairgrieve et al.

(10) Patent No.: US 9,701,292 B2
(45) Date of Patent: Jul. 11, 2017

(54) VEHICLE SPEED CONTROL SYSTEM

(71) Applicant: Jaguar Land Rover Limited, Whitley, Coventry, Warwickshire (GB)

(72) Inventors: Andrew Fairgrieve, Rugby (GB); Daniel Woolliscroft, Birmingham (GB); James Kelly, Solihull (GB); Adam Southgate, Rugby (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 152 days.

(21) Appl. No.: 14/421,915

(22) PCT Filed: Aug. 14, 2013

(86) PCT No.: PCT/EP2013/067010
§ 371 (c)(1),
(2) Date: Feb. 16, 2015

(87) PCT Pub. No.: WO2014/027033
PCT Pub. Date: Feb. 20, 2014

(65) Prior Publication Data
US 2015/0191160 A1    Jul. 9, 2015

(30) Foreign Application Priority Data

Aug. 16, 2012  (GB) .................................... 1214651.0
May 1, 2013    (GB) .................................... 1307885.2

(51) Int. Cl.
*B60K 31/02* (2006.01)
*B60T 8/32* (2006.01)
(Continued)

(52) U.S. Cl.
CPC ............... *B60T 8/32* (2013.01); *B60K 28/16* (2013.01); *B60K 31/02* (2013.01); *B60K 31/04* (2013.01);
(Continued)

(58) Field of Classification Search
None
See application file for complete search history.

(56) References Cited

U.S. PATENT DOCUMENTS 4,627,311 A   12/1986  Yokooku et al.
4,961,146 A   10/1990  Kajiwara
(Continued)

FOREIGN PATENT DOCUMENTS

DE    4241805 A1    6/1994
EP    2404803 A1    1/2012
(Continued)

OTHER PUBLICATIONS

International Search Report for application No. PCT/EP2013/067010, dated Oct. 23, 2013, 3 pages.
(Continued)

*Primary Examiner* — Khoi Tran
*Assistant Examiner* — Ryan Rink
(74) *Attorney, Agent, or Firm* — Reising Ethington P.C.

(57) ABSTRACT

A speed control system operable to control a motor vehicle to operate in accordance with a set-speed value, the control means being operable to allow a user to adjust the set-speed value by user actuation of a vehicle brake control or a vehicle accelerator control.

20 Claims, 6 Drawing Sheets

(51) Int. Cl.
*B60K 28/16* (2006.01)
*B60K 31/04* (2006.01)
*B60T 8/175* (2006.01)
*B60W 30/14* (2006.01)
*F16H 61/02* (2006.01)
*F16H 59/66* (2006.01)

(52) U.S. Cl.
CPC ........... *B60T 8/175* (2013.01); *B60W 30/143* (2013.01); *F16H 61/0213* (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 2540/10* (2013.01); *B60W 2540/12* (2013.01); *B60W 2550/141* (2013.01); *B60Y 2200/20* (2013.01); *F16H 59/66* (2013.01); *F16H 2061/0234* (2013.01)

(56) References Cited

U.S. PATENT DOCUMENTS

| | | | |
|---|---|---|---|
| 4,969,103 A | 11/1990 | Maekawa | |
| 5,845,726 A * | 12/1998 | Kikkawa | B60K 31/047 180/178 |
| 6,058,347 A | 5/2000 | Yamamura et al. | |
| 6,078,860 A | 6/2000 | Kerns | |
| 2004/0195022 A1 | 10/2004 | Inoue | |
| 2005/0071068 A1* | 3/2005 | Funato | B60W 10/06 701/54 |
| 2009/0036266 A1* | 2/2009 | Kondou | B60T 7/126 477/92 |
| 2010/0145588 A1 | 6/2010 | Reuschel et al. | |
| 2012/0065863 A1 | 3/2012 | Takagi et al. | |
| 2012/0081051 A1* | 4/2012 | Kobayashi | B60K 6/48 318/400.23 |
| 2012/0231926 A1* | 9/2012 | Erbguth | B60W 10/08 477/93 |
| 2014/0095038 A1* | 4/2014 | Breu | B60W 10/02 701/67 |

FOREIGN PATENT DOCUMENTS

GB 2350699 A 12/2000
JP 0270535 A 3/1990

OTHER PUBLICATIONS

UK Combined Search and Examination Report for corresponding application No. 1307885.2, dated Aug. 13, 2013, 7 pages.
Written Opinion for application No. PCT/EP2013/067010, dated Oct. 23, 2013, 5 pages.

* cited by examiner

VEHICLE SPEED CONTROL SYSTEM

FIELD OF THE INVENTION

The invention relates to a system for controlling the speed of a vehicle. In particular, but not exclusively, embodiments of the invention relates to a system for controlling the speed of a land-based vehicle which is capable of driving in a variety of different and extreme terrains and conditions.

BACKGROUND TO THE INVENTION

In known vehicle speed control systems, typically referred to as cruise control systems, the vehicle speed is maintained once set by the user without further intervention by the user so as to improve the driving experience for the user.

The user selects a speed at which the vehicle is to be maintained, and the vehicle is maintained at that speed for as long as the user does not apply a brake or, in some systems, the clutch. The cruise control system takes its speed signal from the driveshaft or wheel speed sensors. When the brake or the clutch is depressed, the cruise control system is disabled so that the user can change the vehicle speed without resistance from the system. If the user depresses the accelerator pedal the vehicle speed will increase, but once the user removes his foot from the accelerator pedal the vehicle reverts to the pre-set cruise speed.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly.

Such systems are usually operable only above a certain speed, typically around 15 mph., and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

It is also known to provide a control system for a motor vehicle for controlling one or more vehicle subsystems. U.S. Pat. No. 7,349,776, the content of which is hereby incorporated by reference, discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller.

SUMMARY

Embodiments of the invention may be understood with reference to the appended claims.

Aspects of the present invention provide a system, a vehicle and a method.

It is with a view to addressing the aforementioned limitations of existing systems that the present invention provides, in an aspect of the invention for which protection is sought, a speed control system operable to control a motor vehicle to operate in accordance with a set-speed value, the control system being operable to allow a user to adjust the set-speed value by actuation of a vehicle brake control member or a vehicle accelerator control member.

By actuation is meant that a user manipulates the control member in such a manner as to trigger the speed control system to change the set-speed value.

By vehicle brake control is meant a control by means of which a user may apply (activate) a vehicle braking system. The vehicle braking system may be referred to as a foundation braking system. The brake control may for example comprise a brake pedal. The foundation braking system may include a friction braking system and optionally a regenerative braking system. In some embodiments the foundation braking system may comprise a regenerative braking system instead of or in addition to a friction braking system.

By vehicle accelerator control is meant a control by means of which a user may increase a speed of the vehicle. The accelerator control may comprise an accelerator pedal.

In conventional cruise control systems for highway driving a control for changing the set-speed of a cruise control system is typically provided in the form of a '+/−' button mounted on or adjacent to a steering wheel of the vehicle. In vehicles operating in off-highway conditions, a user may be required to perform relatively rapid rotations of the steering wheel and/or rotate the wheel through relatively large angles whilst negotiating difficult terrain. As such it may be difficult for the user to manipulate the '+/−' buttons at the same time. Furthermore, the user might inadvertently depress the wrong button and cancel speed control, or change the set-speed in a manner that is unintended. Embodiments of the present invention have the advantage that a control by means of which the set-speed may be changed may be provided separately from the steering wheel. Furthermore, the control for changing the set-speed may be controlled by a foot of the user rather than by hand, leaving the user's hands free to continue steering the vehicle.

By employing a brake pedal to reduce the set-speed, a relatively intuitive means may be provided to enable the user to change the set-speed. Similarly, by employing an accelerator pedal to increase the set-speed value, set-speed may be increased in an intuitive manner.

The system may be operable to allow the user to reduce the set-speed value by actuation of the brake control member.

The brake control member may comprise a brake pedal.

The system may be operable to reduce the set-speed value when a force that is within a prescribed range of values of force from a first non-zero brake control force value to a second brake control force value greater than the first is applied to the brake control member, wherein the second brake control force value is less than a value required for application of maximum braking by a braking system of the vehicle.

It is to be understood that if the force is less than the first brake control force value or greater than the second brake control force value, the system does not change the set-speed value.

It is to be understood that the second value may correspond to relatively light braking. For example, application of braking torque that is in the range from 5% to 20% of a maximum available braking torque from the braking system.

Advantageously the second brake control force value may be less than or substantially equal to 20% of the force required to achieve maximum braking torque from the braking system. Other values are also useful.

The first brake control force value may be in the range from 1% to 5% of the force required to achieve maximum braking torque from the braking system, provided that a difference between the first and second brake control force values is not less than 5% of the force required to achieve maximum braking torque from the braking system. Other values are also useful.

Alternatively or in addition, the system may be operable to allow the user to reduce the set-speed value by user actuation of the brake control member, the system being arranged to reduce the set-speed value when a value of braking system pressure is in a range from a first braking system pressure value to a second braking system pressure value greater than the second, wherein the second braking system pressure value is less than that corresponding to a maximum pressure that may be developed by the braking system in response to actuation of the brake control member.

Thus, if the value of braking system pressure is less than the first braking system pressure value or greater than the second braking system pressure value in response to user actuation of the brake control member, the system does not reduce the set-speed value.

This arrangement is useful in vehicles having braking systems that rely on pressurised fluid such as pressurised hydraulic brake fluid in order to actuate the brakes of the braking system (i.e. to actuate the braking system).

The second braking system pressure value may be less than or substantially equal to 20% of the maximum value achievable in response to actuation of the brake control member.

The first brake pressure value may be in the range from 1% to 5% of the maximum value achievable in response to actuation of the brake control member.

Further alternatively or in addition, the system may be operable to allow the user to reduce the set-speed value by user actuation of the brake control member by translating the control by an amount that is within a prescribed range of travel.

The prescribed range may be a range from a first value of travel above substantially zero travel to a second value of travel greater than the first value, the second value being less than a maximum allowable value of travel.

The value may be an absolute distance such as a linear or angular distance from substantially zero travel, or a proportion of a maximum allowable travel from the position of substantially zero travel. By substantially zero travel is meant a position of the control member in a 'released' condition thereof.

It is to be understood that if the amount of travel is less than the first value of travel or greater than the second value of travel in response to user actuation of the brake control member, the system does not change the set-speed value.

The first and second values may correspond to 2% and 10%, respectively, of the maximum allowable value of travel. Other values are also useful.

The range of force, brake pressure or travel required to reduce the set-speed may be less than that required to apply the foundation braking system. That is, the range may be within a 'dead band' of pressure or stroke. Alternatively, the range may include values sufficient to cause application of the foundation braking system across a part or the whole of the range.

In some embodiments where the range includes values sufficient to cause application of the foundation braking system, in the event the user applies pressure in the prescribed range or effects translation of the brake pedal within the prescribed range sufficient to actuate the foundation braking system, the speed control system may be operable to compensate for or manage the response of the vehicle to braking torque applied when the foundation braking system is applied by application of increased powertrain torque. The response may be managed so as to result in substantially no net increase or decrease in net drive torque due to actuation of the braking system in response to translation of the pedal. Other arrangements are also useful.

The system may be operable to compensate for an increase in brake torque applied when the user actuates the brake control member to reduce the value of vehicle set-speed by causing application of increased drive torque to one or more wheels of the vehicle.

The drive torque may be increased in proportion to the amount of brake torque applied.

Optionally, the system is operable to compensate for the increase in brake torque only when the system is causing the vehicle to operate in accordance with the set-speed value and brake torque is being applied by the braking system.

The system may be configured not to reduce the set-speed value in response to user actuation of the brake control member unless the user actuates the brake control member for a period exceeding a first prescribed period.

The system may be configured wherein, if the user actuates the brake control member so as to reduce the set-speed value for longer than a second prescribed period greater than the first, the system reduces the set-speed progressively over time during the remaining period for which the user continues to actuate the brake control member in such a manner as to reduce set-speed.

The system may be operable to allow the user to increase the set-speed value by actuation of the accelerator control member.

The accelerator control member may comprise an accelerator pedal.

The system may be operable to increase the set-speed value when a force that is within a prescribed range of values of force from a first accelerator control force value to a second accelerator control force value greater than the first is applied to the accelerator control member, wherein the second accelerator control force value is less than a value required for development of maximum available powertrain torque by a powertrain of the vehicle in response to actuation of the accelerator control member.

It is to be understood that if the force is less than the first accelerator control force value or greater than the second accelerator control force value, the system does not increase the set-speed value.

It is to be understood that the second value may correspond to relatively light acceleration. For example, development of powertrain torque that is in the range from 5% to 20% of a maximum available powertrain torque in response to actuation of the accelerator control member.

Optionally, the second accelerator control force value is less than or substantially equal to 20% of the force required to achieve maximum powertrain torque.

The first accelerator control force value may be in the range from 1% to 5% of the force required to achieve maximum available powertrain torque, provided that a difference between the first and second accelerator control force values is not less than 5% of the force required to achieve maximum available powertrain torque. Other values are also useful.

Alternatively or in addition, the system may be operable to allow the user to increase the set-speed value by user actuation of the accelerator control member by translating the control by an amount that is within a prescribed range of travel.

The prescribed range may be a range from a first value of travel from substantially zero travel to a second value of travel greater than the first value, the second value being less than a maximum allowable value of travel.

The value may be an absolute distance such as a linear or angular distance from substantially zero travel, which may correspond to a released condition of the control member, or be a proportion of a maximum allowable travel from the position of substantially zero travel.

It is to be understood that if the amount of travel is less than the first value of travel or greater than the second value of travel in response to user actuation of the accelerator control member, the system does not increase the set-speed value.

The first and second values may correspond to 2% and 10%, respectively, of the maximum allowable value of travel. Other values are also useful.

The system may be operable to compensate for an increase in powertrain torque applied when the user actuates the accelerator control member to increase the value of vehicle set-speed by causing application of increased brake torque to one or more wheels of the vehicle in proportion to the increase in powertrain torque.

The system may be operable to compensate for the increase in powertrain torque only when the system is causing the vehicle to operate in accordance with the set-speed value and an increase in powertrain torque is being effected in response to actuation of the accelerator control member.

The system may be configured not to increase the set-speed value in response to user actuation of the accelerator control member unless the user actuates the accelerator control member for a period exceeding a first prescribed period.

The system may be configured wherein, if the user actuates the accelerator control member so as to increase the set-speed value for longer than a second prescribed period greater than the first, the system increases the set-speed progressively over time during the remaining period for which the user continues to actuate the accelerator control member in such a manner as to increase set-speed.

The system may be operable to provide haptic feedback to the user to indicate that the control member has been actuated by an amount sufficient to cause the set-speed value to change.

The system may be operable to cause one selected from amongst vibration of the control member that has been actuated and an audible alert, when the control member has been actuated by an amount sufficient to cause the set-speed value to change.

It is to be understood that although in some embodiments the set-speed value may not change until a prescribed period has expired, haptic feedback may nevertheless be provided whilst the control member is actuated by an amount that is sufficient to cause (i.e. will result in) the set-speed value changing when the prescribed period has expired. The user may therefore ensure that the control member remains actuated by a sufficient amount until the desired value of set-speed has been achieved.

It is to be understood that the system may be configured to apply one or more mechanical pulses to the control member. Alternatively or in addition the system may be configured to cause the control member to vibrate, optionally to vibrate in a pulsed manner such that a plurality of pulses of vibrations may be felt by a user.

It is to be understood that time-varying feedback in the form of pulses of vibrations may be more noticeable to a user without causing undue distraction compared with a single period of vibration when a control member is actuated by an amount sufficient to change the set-speed value.

The haptic feedback may for example provide pulses, vibrations and/or sounds at a different amplitude and/or frequency to those that may be associated with ABS operation.

Optionally the system may be operable to generate one or more sounds when the control member is actuated by an amount sufficient to change the set-speed value.

The system may be operable to provide haptic feedback to the user to indicate an amount of actuation of a control member beyond which the system will no longer cause an adjustment of set-speed.

This feature has the advantage that the user may obtain an indication of the maximum amount of actuation they may apply before the system will no longer cause an increase in set-speed. In the case of a brake control member, this may also correspond to an amount of actuation above which the speed control system will cancel or suspend speed control.

The system may be operable to cause a temporary increase in a resistance of the control member to actuation by a user (followed by an immediate decrease) as the user increases the amount of actuation above the amount below which the system causes an adjustment of set-speed. This phenomenon may be referred to as an effort bump, in that an increase in effort is required to 'push beyond' the position of the control member above which the system does not cause an adjustment of set-speed. For values of actuation below and above the region of the effort bump, an amount of effort required to actuate the control member is substantially the same as that in the absence of haptic feedback, such as the effort bump.

In other words, the user may feel a momentary increase in resistance to actuation as the control member approaches the position of the control member beyond which the value of set-speed will no longer be changed automatically by the speed control system, followed by a momentary decrease in resistance as the control member continues to be actuated (e.g. depressed further by a user's foot, in the case of a foot pedal). For further actuation of the control member (still further depression of the pedal, for example), the control member will function in the expected manner in the absence of haptic feedback. Other arrangements are also useful.

In some embodiments, the user may experience an increase in resistance of the brake control to actuation thereof throughout a range of position, applied force value or value of brake pressure sufficient to cause a change in set-speed.

The range of position, force or brake pressure that causes haptic feedback may be referred to as a 'haptic zone'. In some embodiments an increase in resistance may be provided before an amount of travel of the pedal or an amount of applied force or brake pressure developed is sufficient to exit the haptic zone.

In some embodiments one or more audible clicks, tones or pulses may be generated when the control is in the haptic zone. HMI (human machine interface) feedback may also be provided to a user in response to actuation of the control in the haptic zone with the speed control system operational.

The system may be operable in an off highway condition and a highway condition.

It is to be understood that the conditions are mutually exclusive in that the vehicle cannot operate simultaneously in both the off highway and highway conditions at substantially the same time.

The off highway (or 'off road') condition may be implemented by means of a progress control system or low speed progress control system. The on-highway condition may be implemented by means of a cruise control system. Other arrangements are also useful.

The system may be operable to allow a user to adjust vehicle set-speed by user actuation of the vehicle brake control or the vehicle accelerator control only when operating in the off highway condition.

In some embodiments any dead band present in brake and/or accelerator control member travel may be increased artificially when off-highway speed control is operational. That is, an amount of initial force or amount of travel or stroke of the control member required in order to actuate the braking system or increase powertrain torque may be increased when off-highway speed control is operational.

In some embodiments, if the speed control system (or any other controller such as a brake controller) detects that a rate of travel of the brake pedal, or a rate of increase of pressure applied to the brake pedal exceeds a prescribed rate even whilst still within the dead band, the braking system of the vehicle may be commanded to be applied. This feature has the advantage that a speed at which a braking system is able to respond to an emergency braking control input may be increased.

In some embodiments the system may be operable to allow a user to adjust vehicle set-speed by user actuation of the vehicle brake control or the vehicle accelerator control when operating in either the off highway condition or the highway condition.

For example, in some embodiments when the vehicle is operating in a low speed progress control condition or an on-highway cruise control condition, the set-speed may be adjusted by means of the brake or accelerator controls. It is to be understood that embodiments of the invention are also suitable for use in vehicles not having an off highway operating condition or vehicles not having an on highway cruise control system.

In a further aspect of the invention for which protection is sought there is provided a vehicle comprising a system according to the preceding aspect.

In a still further aspect of the invention for which protection is sought there is provided a method of controlling speed of a motor vehicle comprising causing the vehicle to operate in accordance with a set-speed value, the method comprising allowing a user to adjust the set-speed value by actuation of a vehicle brake control member or a vehicle accelerator control member.

In an aspect of the invention for which protection is sought there is provided a method of speed control for a vehicle, the method comprising reducing automatically a set speed of the vehicle in dependence on user actuation of a vehicle brake control. The set speed may be reduced in incremental steps over a period of time.

In a further aspect of the invention for which protection is sought there is provided a method of speed control for a vehicle, the method comprising increasing automatically a set speed of the vehicle in dependence on user actuation of a vehicle accelerator control. The set speed may be increased in incremental steps over a period of time.

In a still further aspect of the invention for which protection is sought there is provided a method of speed control for a vehicle, the method comprising reducing automatically a set speed of the vehicle in dependence on user actuation of a vehicle brake control and increasing automatically a set speed of the vehicle in dependence on user actuation of a vehicle accelerator control.

It is to be understood that in some embodiments, if the set speed is decreased the speed control system may be operable to change a gear ratio of a transmission in order to ensure sufficient drive torque is available to negotiate an obstacle. The speed control system may be operable to increase the gear ratio.

Thus, in some arrangements as the user decreases the set speed an engine speed may increase, for example if the set speed falls below a prescribed value such as 5 km/h or any other suitable speed. Reduction in set speed may signify that a user intends to negotiate an obstacle such as a boulder, a steep incline or other obstacle.

It is to be understood that by enabling a user to change the set speed of the speed control system by means of relatively light pedal inputs, the vehicle may be driven off road at low speed (for example below 50 km/h) without the user needing to manually manipulate a speed setting control on the steering wheel. This greatly reduces user workload and makes vehicle operation with speed control active more intuitive. Embodiments of the invention also enable de-cluttering of switch packs on or around the steering wheel or other steering control of the vehicle. It is to be understood that in some scenarios it is vital that a user's attention is not distracted from the terrain on which the vehicle is being driven. By eliminating the requirement for the user to focus their attention inside the vehicle when changing the set speed, for example by manipulating hand or finger controls within the vehicle, an improved user experience may be achieved.

In an embodiment, if the user initiates speed control and the vehicle is travelling below a threshold speed and/or the vehicle has been set to an off road driving mode (for example by selection of a terrain response (TR) mode or selection of a low-ratio gear), or if the vehicle otherwise determines that it is being driven off road, then the speed control system will operate in an off-road condition (or mode) and accept set speed adjustment commands via brake and/or accelerator controls such as brake and/or accelerator pedals as described above whilst remaining in a speed control active condition.

In some embodiments, if the user initiates speed control whilst the vehicle is travelling above a predetermined speed and/or is being driven on-highway (as indicated by a 'high' gear ratio selected as opposed to 'low' gear ratio) or if the terrain response (TR) mode is deselected (in some embodiments a 'special programs off' TR mode is selected), the speed control system may only accept speed adjustments by means of hand-operated controls typically located on or adjacent a steering wheel of the vehicle. If the user presses the brake pedal, even lightly, during speed control operation (in the on-road or on-highway condition) then speed control operation may be suspended and the vehicle may start to coast until the user presses the throttle pedal or re-activates speed control via a hand operated switch.

In some embodiments the user may adjust the speed of the vehicle whilst traveling in the off-highway speed control condition either by pressing the brake pedal (in order to reduce the set speed) or by pressing the accelerator pedal (in order to increase the set speed) in the manner described herein.

In one aspect of the invention for which protection is sought there is provided a speed control system comprising control means operable to control a motor vehicle to maintain a set speed, the control means being operable to allow a user to change the set speed by user actuation of a foot pedal. The system may be operable to decrease the set speed by user actuation of the brake pedal. In addition or instead the system may be operable to increase the set speed by user actuation of an accelerator pedal.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described by way of example only with reference to the following figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
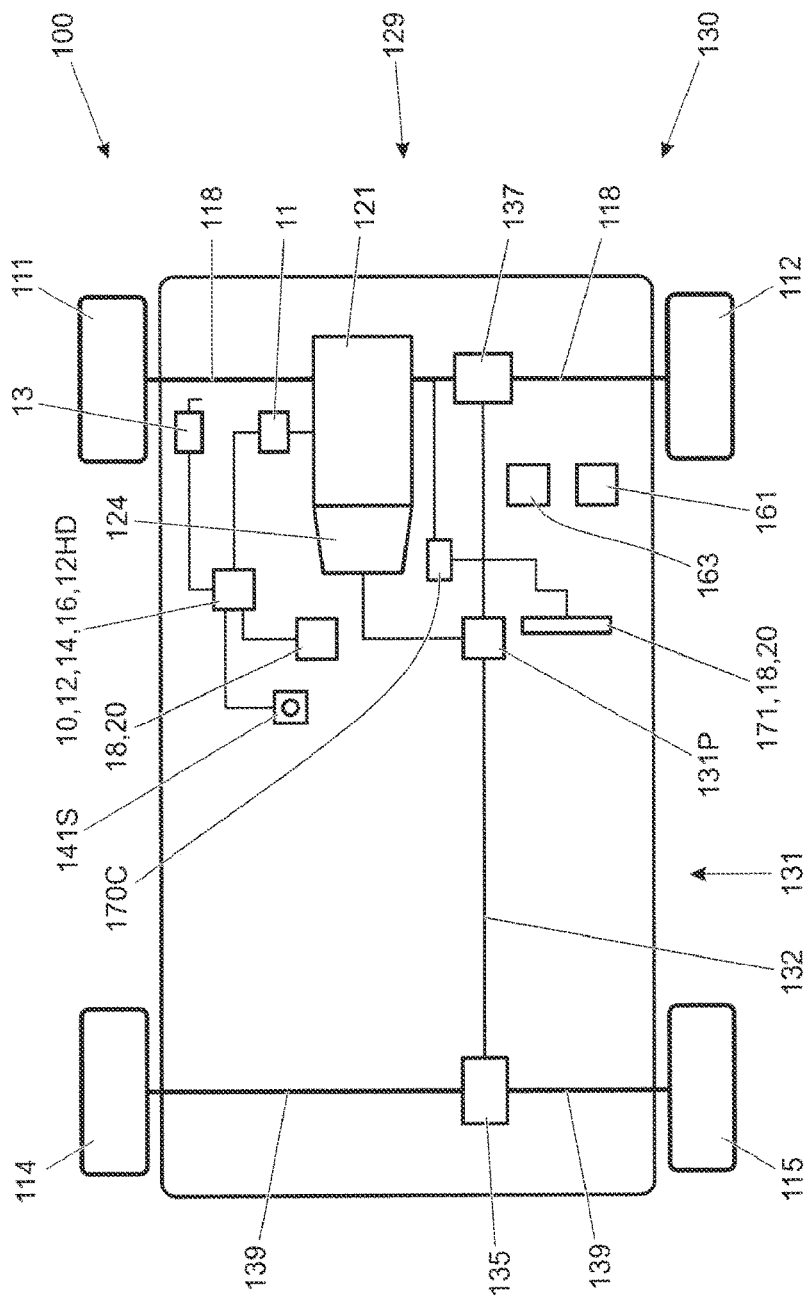
FIG. 1 is a schematic illustration of a vehicle according to an embodiment of the invention in plan view.
Figure 2:
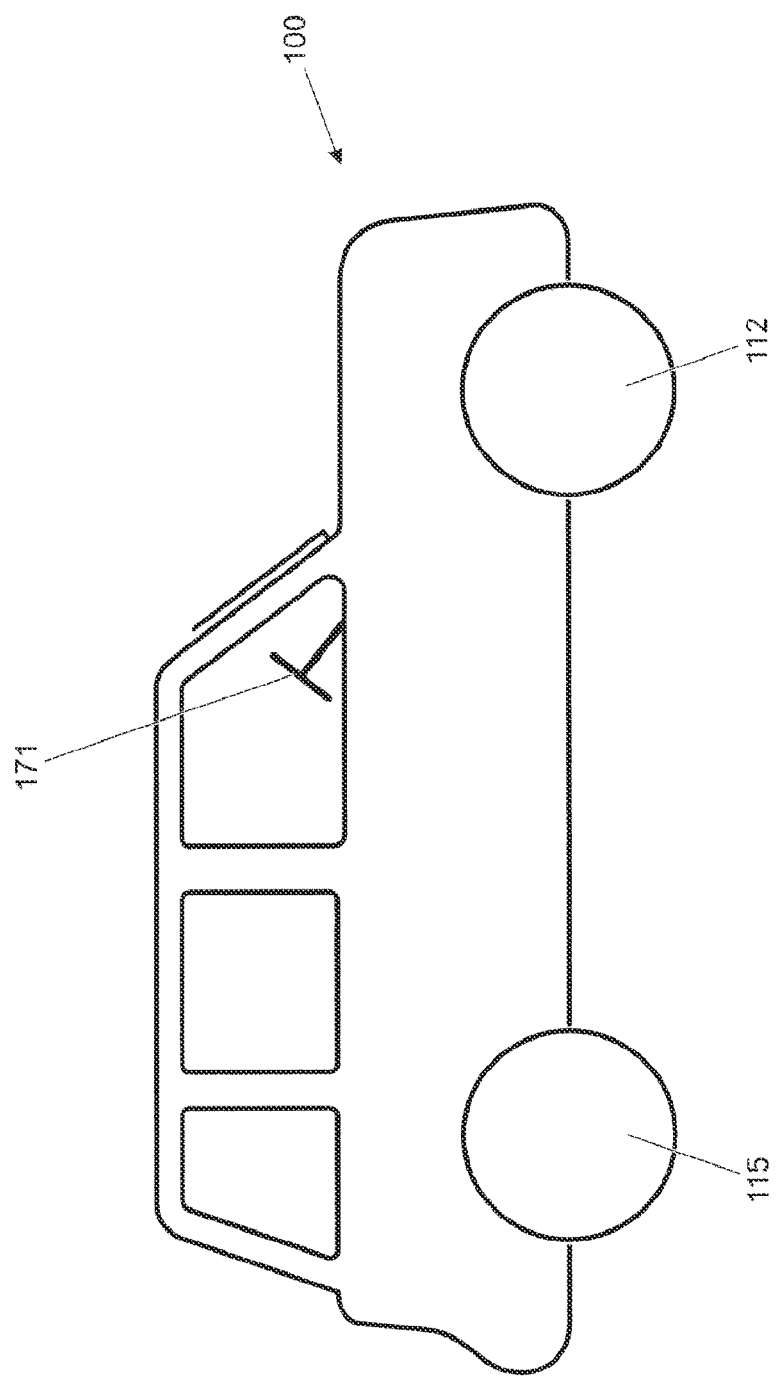
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
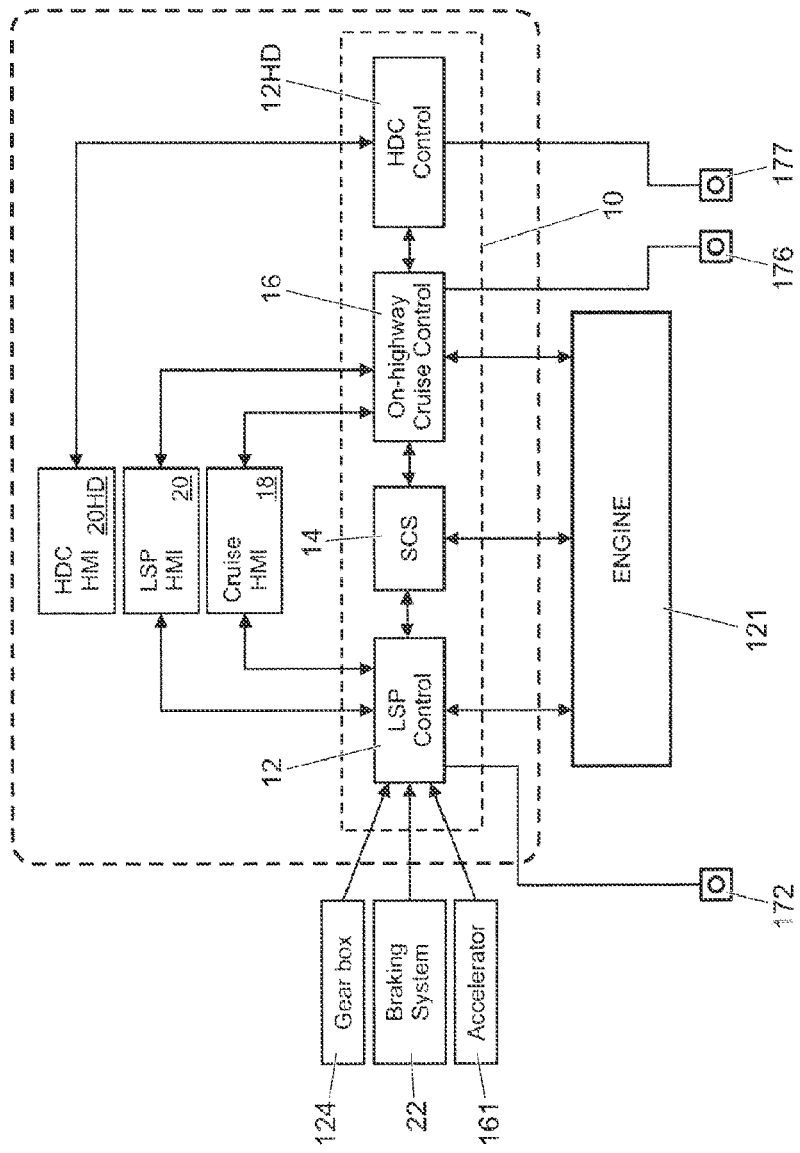
FIG. 3 is a high level schematic diagram of an embodiment of the vehicle speed control system of the present invention, including a cruise control system and a low-speed progress control system.

A control system for the vehicle 100 includes a central controller 10, referred to as a vehicle control unit (VCU) 10, a powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 5:
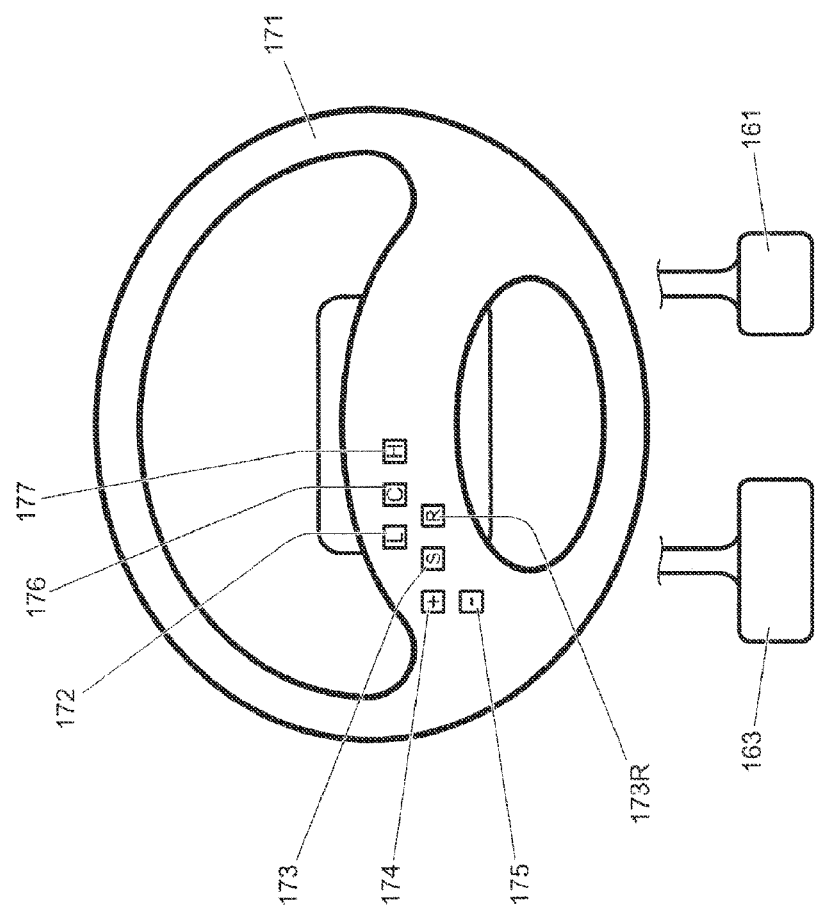
FIG. 5 illustrates a steering wheel and brake and accelerator pedals of a vehicle according to an embodiment of the present invention.

As noted above the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver override. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+/−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC function block of the VCU 10 forms part of a HDC system 12HD. When the HDC system 12HD is active, the system 12HD controls the braking system 22 (of which the ABS function block forms part) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system is active, the HDC system 12HD controls the braking system 22 (FIG. 3) to prevent vehicle speed from exceeding the HDC_set-speed. In the present embodiment the HDC system 12HD is not operable to apply positive drive torque. Rather, the HDC system 12HD is only operable to apply negative brake torque.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter, HDC_set-speed, and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 30 kph or less and no other speed control system is in operation, the HDC system 12HD assumes a standby mode. If the user subsequently presses the 'set-speed' button 173 the HDC system 12HD sets the value of HDC_set-speed to the instant vehicle speed. If the HDC system 12HD is selected when the vehicle 100 is travelling at a speed above 30 kph but not exceeding 50 kph and the driver is not depressing the accelerator pedal 161, the HDC system 12HD is configured to slow the vehicle to 30 kph, being the maximum allowable value of HDC_set-speed by means of the powertrain 129 and/or braking system 22 at a deceleration rate not exceeding a maximum allowable rate. The rate may be 1.25 ms-2 or any other suitable value. The HDC system then assumes the standby mode until the driver sets a value of HDC_set-speed.

It is to be understood that the VCU 10 is configured to implement a known Terrain Response (TR)® System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the 'off' condition the LSP control system 12 is not responsive to input controls unless the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful. It is to be understood that the intermediate condition therefore corresponds to a condition in which the HDC system 12HD is active. In some embodiments, the intermediate condition of the LSP control system 12 is implemented by activating the HDC system 12 HD.

With the LSP control system 12 in the active condition, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 in the active condition the '+' and '−' buttons 174, 175 are disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst traveling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
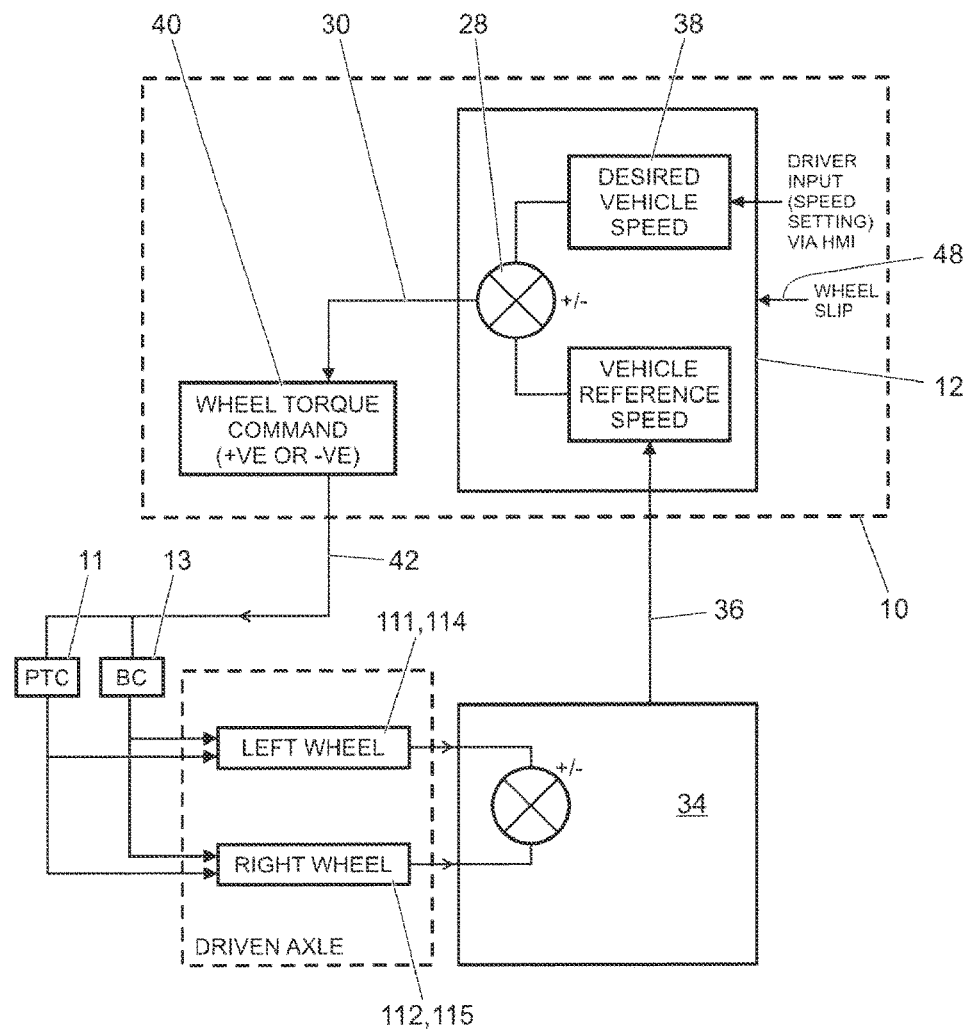
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14 generates the wheel slip event signal 48 and supplies it to the LSP control system 12 and cruise control system 16.

A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation by the user in such conditions can be a difficult and often stressful experience and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, including wheel speed sensors, as mentioned previously with respect to FIG. 4, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB1111288.5, GB1211910.3 and GB1202427.9, the contents of each of which is incorporated herein by reference.

The nature of the terrain over which the vehicle is travelling (as determined by reference to the selected control mode) may also be utilised in the LSP control system 12 to determine an appropriate increase or decrease in drive torque that is to be applied to the vehicle wheels. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

A further embodiment of the invention (not shown) is one in which the system 12 is provided with a memory arranged to store previously set, user defined set speeds in addition to that which was last set be the user. In this way, the user may quickly access more than one set speed via the resume button or other appropriate control. In this embodiment, the user may be operating the vehicle at a set speed of 10 mph, but choose to reduce this to 6 mph to negotiate an obstacle off-road. The system 12 is arranged to store both 6 mph and 10 mph, such that if the system 12 intervenes and reduces the speed further to 4 mph, the user may request the system to accelerate to 6 mph with a single press of the resume button, or 10 mph with a double press of the resume button. The system 12 may be provided with means to display the stored set-speeds to the user, for example by illuminated markers or chaplets arranged at appropriate locations around a speedometer. In such an example, the system 12 may be arranged to independently or in conjunction with TR mode setting, prevent the user accessing pre-set speeds from the memory and applying them if it is determined they would be too fast for the terrain over which the vehicle is presently moving. Instead, the system 12 may be arranged to accelerate up to the highest speed it determined appropriate for the terrain and will continue to accelerate towards the chosen set-speed as the terrain permits. In this example, the system 12 will manage the acceleration of the vehicle within a predefined acceleration corridor, for example from 0.1 to 0.2 g. The system 12 may be provided with means to indicate to the user the current status and that the system 12 is working to resume the user defined set speed once it becomes appropriate for the terrain. The system 12 is arranged to permit the user to override the system 12 at any time in the aforementioned manner.

As described above, when the LSP control system 12 active, the user may increase or decrease the vehicle set speed by means of the '+' and '−' buttons 174, 175. In addition, the user may also increase or decrease the vehicle set speed by lightly pressing the accelerator or brake pedals 161, 163 respectively. In some embodiments, with the LSP control system 12 active the '+' and '−' buttons 174, 175 are disabled.

Figure 6:
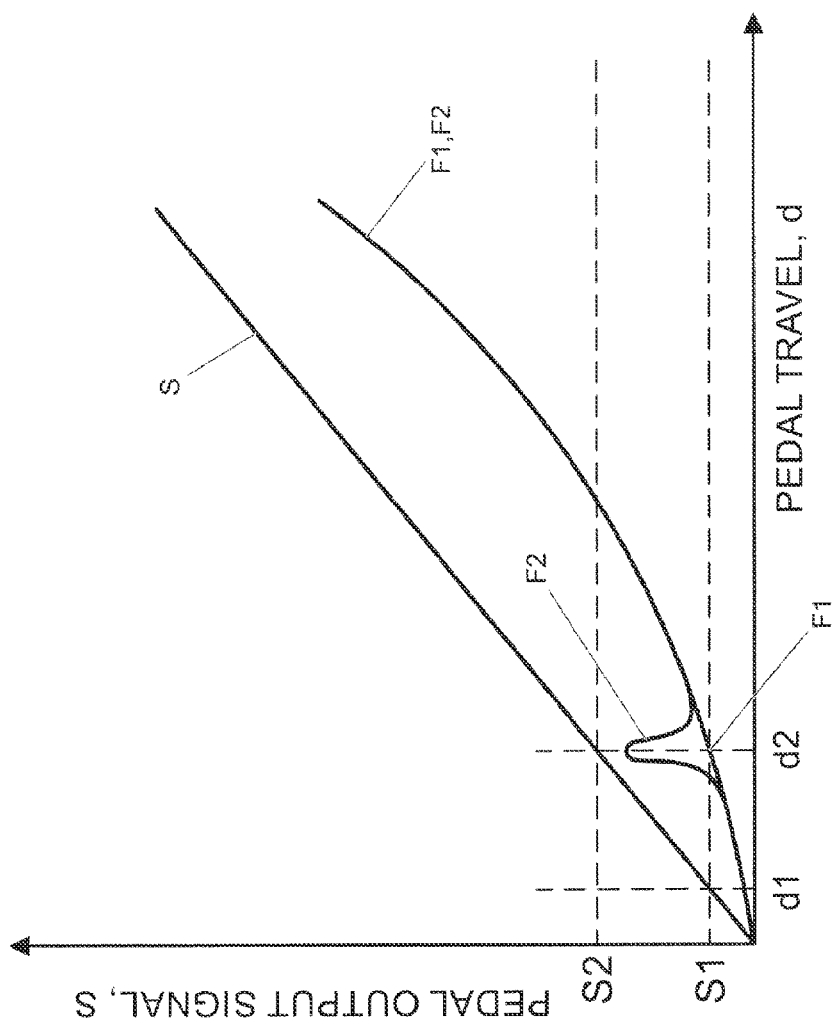
FIG. 6 shows a plot of pedal output signal S as a function of pedal travel d in a vehicle according to an embodiment of the present invention.

FIG. 6 is a plot of pedal output signal, s, as a function of accelerator or brake pedal travel, d, being the amount by which the pedal 161, 163 has been pressed (measured for example in terms of linear translation or angular rotation or a proportion of full scale deflection). In the arrangement shown the pedal output signal increases in a substantially linear manner as a function of travel although other arrangements are also useful. In response to the pedal output signal, the braking system 22 is operable to apply brakes of the vehicle 100 and the powertrain controller 11 is operable to change the amount of torque developed by the engine 121. In the present embodiment, the braking system 22 is arranged not to apply the brakes of the vehicle and the powertrain controller 11 is arranged not to change the amount of torque developed by the engine 121 unless the amount (distance) of pedal travel exceeds a threshold distance d2 illustrated in FIG. 6. The region of travel up to distance d2 may therefore be referred to as a 'dead-band' in translation of the pedals 161, 163.

In the present embodiment, if the driver depresses the brake pedal 163 by more than the amount d2 the LSP control system 12 cancels speed control.

The LSP control system 12 is operable to monitor pedal input signals from the accelerator and brake pedals 161, 163. If the amount of pedal travel meets the condition $d1 \le d \le d2$ where $d1 > 0$ for longer than a prescribed period of time, the LSP control system 12 is operable to change the LSP control system set-speed. If the accelerator pedal travel meets this condition the LSP control system 12 increases the set-speed whilst if the brake pedal travel meets this condition the LSP control system 12 decreases the set-speed.

The prescribed period may be any suitable value such as 0.5 s, 1 s or any other suitable value. This feature has the advantage that each time the driver depresses the brake pedal 163 to cancel speed control temporarily, the LSP control system 12 does not reduce the value of set-speed unless the driver holds the brake pedal within the range from d1 to d2 for a sufficiently long period of time before cancelling speed control by the system 12. Other arrangements are also useful.

If the brake pedal output signal s is in the range from s1 to s2 for a period exceeding a first prescribed period of time (such as 0.5 s or 1 s), but less than a second prescribed period, the value of set speed may be decremented by a prescribed amount (in the present embodiment 1 km/h or 1 mph depending on user choice of units). If the brake pedal output signal is in the range from s1 to s2 for more than the second prescribed period of time (which may be 1 s, 1.5 s, 2 s or any other value that is greater than the first prescribed period of time), the value of set-speed is decremented successively in steps whilst the output signal remains in the range from s1 to s2. In some embodiments the value of set-speed may be decremented by 1 km/h or 1 mile/h per 500 ms or other time period during the period for which the pedal signal remains in the range from s1 to s2 after the second period has elapsed.

Alternatively, the LSP control system 12 may be configured to set the rate of deceleration of the vehicle 100 to a prescribed arbitrary rate, and control the vehicle to decelerate at that rate for the period for which the pedal signal remains in the range from s1 to s2 following lapse of the second prescribed period (or in some embodiments, the first prescribed period). Other arrangements are also useful, and other lengths of time are also useful.

It is to be understood that the LSP control system 12 may be configured to respond to movement of the accelerator pedal 161 in an analogous manner to the brake pedal 163 with respect to the value of set-speed, wherein if the accelerator pedal 161 is depressed such that the accelerator pedal output signal is in the range from s1 to s2 for longer than a first prescribed period such as 0.5 s or 1 s, the value of set speed is incremented. If the accelerator pedal output signal is in the range from s1 to s2 for more than a second prescribed amount of time, for example 1.5 s or 2 s, in some embodiments the value of set-speed is incremented in successive steps, for example by 1 km/h or 1 mile/h per 500 ms or other time period during the period for which the pedal signal remains in the range from s1 to s2 after the second period has elapsed. Alternatively the rate of acceleration may be set to an arbitrary rate. Other arrangements are also useful.

In some embodiments, one or both of the values of d1 and d2 may be different for the accelerator and brake pedals 161, 163 respectively.

In an alternative embodiment, the braking system 22 may be operable to apply brakes of the vehicle 100 once the amount of travel of the brake pedal 163 exceeds d1 rather than d2. Thus, in some embodiments the range of travel of the brake pedal 163 over which the braking system 22 is applied may at least partially (and optionally fully) overlap with the range of travel over which the LSP control system set-speed is reduced.

This feature has the advantage that if a brake control such as brake pedal 163 is depressed by an amount in the range from d1 to d2 in order to reduce set speed, at least a light braking force may be applied by the braking system 22 whilst the prescribed period elapses, before the value of set-speed is reduced, depending on the threshold value of d for application of brake torque by the braking system 22. Thus, a more rapid reduction in vehicle speed may occur in response to an attempt by a user to reduce the value of set-speed by means of the brake pedal 163 since brake torque may be applied by the braking system 22 substantially immediately the brake pedal 163 is depressed beyond the threshold value of d for activation of the braking system 22. It is to be understood that if the LSP control system 12 alone is relied on to reduce vehicle speed (with no application of the braking system 22 whilst set-speed is being reduced), the driver must wait until the prescribed period has elapsed, following movement of the brake pedal 163 to a position in the range form d1 to d2, before the LSP control system 12 reduces set speed and then commands application of the braking system 22 if required in response to the reduced set-speed.

In some embodiments, a vehicle 100 may be configured such that if a '−' button 175 or like control is used to reduce speed rather than a brake control when the LSP control system 12 is active, the speed control system 12 may allow vehicle speed to reduce at least initially by coasting rather than application of the braking system 22 or other retarding torque means, with application of the braking system 22 or other retarding means only if the LSP control system 12 determines that such action is required.

In some embodiments, the powertrain controller 11 may be operable to increase the amount of torque developed by the engine 121 only when the amount of travel of accelerator pedal 161 exceeds d1, or any other value less than d2.

This feature has the advantage that if an accelerator control such as an accelerator pedal 161 is depressed by an amount in the range from d1 to d2 in order to increase set-speed, at least a small amount of torque increase may be applied by the powertrain controller 11 directly in response to movement of the accelerator pedal (depending on the threshold value of d for increase of engine torque by the powertrain controller 11 in response to accelerator pedal movement). This torque increase is applied whilst the prescribed period is elapsing before the value of set-speed is increased by the LSP control system 12. Thus, a more rapid increase in vehicle speed may occur in response to an attempt by a user to increase the value of set-speed by means of the accelerator pedal 161. It is to be understood that if the LSP control system 12 alone is relied on to command an increase in vehicle speed, the driver must wait until the prescribed period has elapsed following movement of the accelerator pedal 161 to a position in the range from d1 to d2, before the LSP control system 12 increases the value of set-speed and then commands the powertrain controller 11 to increase the drive torque if required.

It is to be understood that reference herein to a '+' or '−' control is not to be understood as limiting to a control placarded with such symbols. Rather, a '−' control may be understood to include a control other than a brake control for reducing set speed whilst a '+' control may be understood to include a control other than an accelerator control for increasing set speed. The '+' and '−' controls may be manually operated, for example by a user's hand.

Embodiments of the present invention enable enhanced user enjoyment of a vehicle when driving in off-highway conditions.

With reference to FIG. 6, in some embodiments, if the user depresses the brake pedal 163 by an amount of travel in the range from d1 to d2 such that the pedal output signal s has a value in the range from s1 to s2, the LSP control system 12 is operable to provide haptic feedback to the user. The feedback provides an indication to the user that the pedal is within the range of travel over which a change in set-speed may take place. In some embodiments the haptic feedback is in the form of a vibrational excitation applied to the brake pedal 163. In some embodiments, the haptic feedback is not provided if the LSP control system 12 is not controlling vehicle speed. In some embodiments, haptic feedback is also provided in respect of movement of the accelerator pedal 161 in a similar manner. That is, if the accelerator pedal output signal is in the range from s1 to s2 and the LSP control system 12 is in control of vehicle speed, haptic feedback may be provided to the user in the form of vibrational excitation of the pedal 161.

In some embodiments, the LSP control system 12 may be operable to provide haptic feedback to the user to indicate an amount of actuation of the accelerator pedal 161 and/or brake pedal 163 beyond which the system will no longer cause an adjustment of set-speed. In one embodiment, the system 12 is operable to cause an increase in a resistance of the pedal 161, 163 to actuation by a user followed by a decrease in resistance to actuation as the user continues to increase the amount of actuation beyond the amount below which the system causes an adjustment of set-speed.

Thus the system 12 is configured wherein the user will feel an additional increase in resistance to actuation as the control member approaches the position of the pedal 161, 163 beyond which the value of set-speed will no longer be changed automatically by the speed control system. If the user continues to depress the pedal 161, 163 the additional increase is removed and resistance of the pedal 161, 163 to depression by the user reverts to the level the user experiences in the absence of haptic feedback by the system 12. Other arrangements are also useful.

FIG. 6 illustrates this effect. Trace F1 of FIG. 6 is a plot of reaction force F exerted by the brake pedal 163 as the value of pedal travel d increases with the LSP control system 12 switched off. In contrast, if the LSP control system 12 is in the active condition the reaction force follows trace F2. That is, as the value of pedal travel approaches d2, the reaction force F increases to a value higher than that which would be exerted if the LSP control system 12 were switched off. Once the value of pedal travel exceeds d2, the reaction force F falls with increasing pedal travel to the value that would be applied with the LSP control system 12 switched off. This feature may be referred to as an 'effort bump' since a pedal effort (force) required to move the pedal 163 as a function of position increases temporarily when the pedal is in the region of position d2. That is, the reaction force exerted by the pedal 163 in the region of position d2 where the user experiences the effort bump increases at a rate greater than a rate of increase before and after this region. The increase in reaction force is implemented in some embodiments by means of a latch or detent mechanism. In some alternative embodiments an electrical force generator may be employed, for example an electromagnetic device such as a solenoid or like device, to provide the effort bump. Other arrangements are also useful.

It is to be understood that the effort bump may be employed to provide tactile feedback to the user indicating the pedal position beyond which a change in set-speed will no longer be effected automatically by the LSP control system 12.

In some embodiments, the user may experience an increase in resistance of the brake control to actuation thereof throughout a range of values of position, applied force value or value of brake pressure sufficient to cause a change in set-speed. The range of position, force or brake pressure that causes a change in set-speed may be referred to as a 'haptic zone', being a zone in which haptic feedback or tactile feedback is provided to the user. In some such embodiments an increase in resistance may be provided before an amount of travel of the pedal or an amount of applied force or brake pressure developed is sufficient to exit the haptic zone.

In some embodiments one or more audible clicks, tones or pulses may be generated when the control is in the haptic zone. HMI (human machine interface) feedback may also be provided to a user in response to actuation of the control in the haptic zone with the speed control system operational.

It is to be understood that the magnitude of haptic feedback provided to a user may be tuned for each pedal 161, 163 to which haptic feedback is applied in order to provide intuitive feedback to a user. Embodiments of the present invention have the advantage that a user may be provided with guidance when adjusting set-speed by means of the accelerator or brake pedals 161, 163 to as to avoid unintentional cancellation of speed control by the LSP control system 12.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK Patent Application No. 1214651.0 filed 16 Aug. 2012, the entire contents of which are expressly incorporated herein by reference.

The invention claimed is:

1. A speed control system operable to control a motor vehicle to operate in accordance with a set-speed value, the control system being operable to allow a user to reduce the set-speed value by actuation of a vehicle brake control member and/or to allow a user to increase the set-speed value by actuation of a vehicle accelerator control member, the system being further operable to compensate for an increase in brake torque applied by a braking system when the user actuates the brake control member to reduce the set-speed value by causing application of increased drive torque to one or more wheels of the vehicle and/or to compensate for an increase in powertrain torque applied when the user actuates the accelerator control member to increase the set-speed value by causing application of increased brake torque to one or more wheels of the vehicle in proportion to the increase in powertrain torque.

2. A system according to claim 1 operable to compensate for the increase in brake torque only when the system is causing the vehicle to operate in accordance with the set-speed value and brake torque is being applied by the braking system.

3. A system according to claim 1 operable to reduce the set-speed value and compensate for an increase in brake torque when a force that is within a prescribed range of values of force from a first non-zero brake control force value to a second brake control force value greater than the first is applied to the brake control member, wherein the second brake control force value is less than a value required for application of maximum braking by a braking system of the vehicle.

4. A system according to claim 3 wherein the second brake control force value is less than or substantially equal to 20% of the force required to achieve maximum braking torque from the braking system.

5. A system according to claim 1 operable to allow the user to reduce the set-speed value by user actuation of the brake control member, the system being arranged to reduce the set-speed value and compensate for an increase in brake torque when a value of braking system pressure is in a range from a first braking system pressure value to a second braking system pressure value greater than the first, wherein the second braking system pressure value is less than that corresponding to a maximum pressure that may be developed by the braking system in response to actuation of the brake control member.

6. A system according to claim 5 wherein the second braking system pressure value is less than or substantially equal to 20% of the maximum value achievable in response to actuation of the brake control member.

7. A system according to claim 1 operable to allow the user to reduce the set-speed value by user actuation of the brake control member by translating the brake control member by an amount that is within a prescribed range of travel, wherein the prescribed range is a range from a first value of travel above substantially zero travel to a second value of travel greater than the first value, the second value being less than a maximum allowable value of travel.

8. A system according to claim 1 configured not to reduce the set-speed value in response to user actuation of the brake control member unless the user actuates the brake control member for a period exceeding a first prescribed period.

9. A system according to claim 8 configured wherein, if the user actuates the brake control member so as to reduce the set-speed value for longer than a second prescribed period greater than the first, then the system reduces the set-speed progressively over time during a remaining period for which the user continues to actuate the brake control member in such a manner as to reduce the set-speed.

10. A system according to claim 1 operable to compensate for the increase in powertrain torque only when the system is causing the vehicle to operate in accordance with the set-speed value and an increase in powertrain torque is being effected in response to actuation of the accelerator control member.

11. A system according to claim 1 operable to increase the set-speed value and compensate for an increase in powertrain torque when a force that is within a prescribed range of values of force from a first accelerator control force value to a second accelerator control force value greater than the first is applied to the accelerator control member, wherein the second accelerator control force value is less than a value required for development of maximum available powertrain torque by a powertrain of the vehicle in response to actuation of the accelerator control member.

12. A system according to claim 11 wherein the second accelerator control force value is less than or substantially equal to 20% of the force required to achieve maximum powertrain torque.

13. A system according to claim 1 operable to allow the user to increase the set-speed value by user actuation of the accelerator control member by translating the accelerator control member by an amount that is within a prescribed range of travel, wherein the prescribed range is a range from a first value of travel from substantially zero travel to a second value of travel greater than the first value, the second value being less than a maximum allowable value of travel.

14. A system according to claim 1 configured not to increase the set-speed value in response to user actuation of the accelerator control member unless the user actuates the accelerator control member for a period exceeding a first prescribed period.

15. A system according to claim 14 configured wherein, if the user actuates the accelerator control member so as to increase the set-speed value for longer than a second prescribed period greater than the first, the system increases the set-speed progressively over time during a remaining period for which the user continues to actuate the accelerator control member in such a manner as to increase the set-speed.

16. A system according to claim 1 operable to provide haptic feedback to the user to indicate that the control member has been actuated by an amount sufficient to cause the set-speed value to change.

17. A system according to claim 16 operable to provide haptic feedback to the user to indicate an amount of actuation of a control member beyond which the system will no longer cause an adjustment of the set-speed.

18. A system according to claim 17 operable to cause an increase in a resistance of the control member to actuation by a user followed by a decrease in resistance to actuation as the user continues to increase the amount of actuation beyond the amount below which the system will no longer cause an adjustment of the set-speed.

19. A vehicle comprising a speed control system operable to control said motor vehicle to operate in accordance with a set-speed value, the control system being operable to allow a user to reduce the set-speed value by actuation of a vehicle brake control member and/or to allow a user to increase the set-speed value by actuation of a vehicle accelerator control member, the system being further operable to compensate for an increase in brake torque applied when the user actuates the brake control member to reduce the set-speed value by causing application of increased drive torque to one or more wheels of the vehicle and/or to compensate for an increase in powertrain torque applied when the user actuates the accelerator control member to increase the set-speed value by causing application of increased brake torque to one or more wheels of the vehicle in proportion to the increase in powertrain torque.

20. A method of controlling speed of a motor vehicle comprising causing the vehicle to operate in accordance with a set-speed value, the method comprising allowing a user to reduce the set-speed value by actuation of a vehicle brake control member and/or allowing a user to increase in the set-speed value by actuation of a vehicle accelerator control member, the method further comprising compensating for an increase in brake torque applied when the user actuates the brake control member to reduce the set-speed value by causing application of increased drive torque to one or more wheels of the vehicle and/or compensating for an increase in powertrain torque applied when the user actuates the accelerator control member to increase the set-speed value by causing application of increased brake torque to one or more wheels of the vehicle in proportion to the increase in powertrain torque.

* * * * *